United States Patent
Schmidt et al.

[15] 3,655,362
[45] Apr. 11, 1972

[54] PROCESS FOR THE THERMAL REDUCTION OF ALUMINA-BEARING ORES

[72] Inventors: Walther Schmidt, Richmond; Hubert Martin, Chesterfield County, both of Va.

[73] Assignee: Reynolds Metals Company, Richmond, Va.

[22] Filed: May 16, 1969

[21] Appl. No.: 825,399

[52] U.S. Cl. .................................................. 75/68 A, 75/10
[51] Int. Cl. ........................................................ C22b 21/02
[58] Field of Search ................................................. 75/10, 68

[56] References Cited

UNITED STATES PATENTS

| | | | |
|---|---|---|---|
| 2,550,684 | 5/1951 | Fouquet | 75/10 X |
| 3,254,988 | 6/1966 | Schmidt et al. | 45/68 |

*Primary Examiner*—L. Dewayne Rutledge
*Assistant Examiner*—J. Davis
*Attorney*—Glenn, Palmer, Lyne, Gibbs & Thompson

[57] ABSTRACT

Aluminum-silicon alloys having an aluminum content greater than 50 weight percent aluminum are prepared by the thermal reduction of a furnace feed comprising alumina- and silica-bearing ores and elemental silicon to form aluminum alloys. The furnace feed is characterized by containing specified amounts of water of hydration in relation to the total amount of silica and alumina present, a specified amount of elemental silicon in relation to the total amount of silica and alumina and the feed has a silica to alumina ratio falling within specified limits. The thermal reduction is carried out by applying a rate of throughput of materials fast enough to effect dehydration while at the same time minimizing subsequent densification and induration in such a way that the furnace feed does not become fully calcined prior to introduction into the reaction zone of the furnace.

9 Claims, No Drawings

PROCESS FOR THE THERMAL REDUCTION OF ALUMINA-BEARING ORES

BACKGROUND OF THE INVENTION

The thermal reduction of alumina- and silica-bearing materials to form aluminum alloys is well known in the art and the many problems attending such a reduction reaction have been the subject of much investigation by prior art workers in an attempt to obtain an economically efficient process. Among the prior art patents directed towards the improvement of such an operation are U.S. Pat. Nos. 3,254,988 and 3,257,199 which, among other refinements, disclose the concept of minimizing fusion prior to reduction of the furnace charge by replacing a portion of the silica normally needed in the feed with various metallic components including elemental silicon or silicon-containing complexes. The processes disclosed in these two patents have indeed been an improvement over the heretofore practiced processes of the prior art. However, a new process has been discovered which represents an additional improvement in the ultimate goal of obtaining an economically attractive thermal reduction process capable of producing aluminum silicon alloys having an aluminum content greater than 50 percent.

SUMMARY

This invention provides an improved process for carrying out the direct thermal reduction of alumina-bearing materials to form aluminum alloys. The process of this invention has four areas of criticality and it is essential that all of these critical limits be followed since the omission of one will result in failure to obtain the desired benefits.

In the first place, the process of this invention requires the use of a feed material in a substantially hydrated condition. The amount of water of hydration which must be present ranges from 6 to 40 weight percent of the combined weight of alumina and silica in the feed.

The second criticality is that the feed material must contain elemental silicon and said elemental silicon must be present in amounts ranging from about 6 to 23 weight percent based on the weight of alumina and silica in the feed.

The third criticality is that the feed material employed must have an alumina to silica ratio ranging from 2.5:1 to 6.0:1. It has been found that operations outside this range do not result in an economically attractive process.

The fourth criticality resides in operating the furnace at a rate such that the hydrated feed material passes the temperature zone of dehydration and reaches the reaction zone in a time short enough to avoid or substantially minimize its densification, thus maintaining a high ratio of surface to weight prior to its reaching the reaction zone.

DESCRIPTION OF PREFERRED EMBODIMENTS

As has heretofore been stated, the direct thermal reduction of alumina-bearing materials to form aluminum alloys is a well-known process. However, the overall economy of this process has not been particularly attractive and much effort has been spent by prior art workers to arrive at methods of improving thermal reduction processes in order to economically optimize them. One reason which seriously detracts from the overall economy of the operation is the fact that the reduced aluminum metal easily back reacts with the carbon present as the reducing agent or the carbon monoxide inherently formed in reaction system to yield aluminum carbide. The presence of aluminum carbide is extremely undesirable, mainly due to the fact that it can form a fused ternary system with aluminum and aluminum oxide. The fused ternary system is extremely viscous and creates many practical operating problems since it accumulates at the cooler parts of the furnace, building up gummy masses which ultimately must be removed by shutting down the furnace and cleaning it.

Another disadvantage of the heretofore practiced process resides in the fact that the aluminum metal resulting from the reduction of the alumina-bearing ores has a tendency to be vaporized out of the reaction zone and into the atmosphere, thereby detracting from the overall yield of aluminum.

Another proposal heretofore suggested involved counteracting the formation of aluminum carbide by the simultaneous reduction of silica to form silicon. However, relatively large amounts of silica must be employed, and when this happens, the furnace feed tends to form fused masses before silica is substantially reduced. Operating with a relatively large amount of silica in the feed can lead to the formation of gummy, viscous products containing oxides, carbides, and reduced metals which tend to accumulate in the cooler parts of the furnace, thereby necessitating shutdown of the furnace and expensive cleaning operations.

In an attempt to arrive at an improved process, the prior art resorted to replacing a portion of the silica with metallic silicon. However, the advantages gained by the use of silicon were, until very recently, offset by losses in both products and starting materials due to inefficiencies resulting from the improper integration of the various steps of the process cycle.

One very successful solution to the problem of thermal smelting has, in fact, been found and is disclosed and claimed in U.S. Pat. No. 3,254,988. The process therein disclosed involves the addition of metallic silicon to the furnace feed and a careful integration of separation and purification steps so as to achieve an economically sound procedure.

The process of the instant invention is a still further improvement in the direct thermal reduction of alumina-bearing ores.

All the prior art processes involving the direct thermal reduction of alumina-bearing ores, although differing in many respects, possess one common characteristic in that the alumina-bearing materials are generally subjected to a full calcination or even fusion procedure prior to the introduction of the feed into the reduction furnace, and/or the feed is permitted to be in contact with heat for a period of time such that full calcination occurs prior to the feed entering into the reduction zone of the furnace.

Surprisingly, it has now been discovered that if a feed material is not fully calcined prior to its introduction into a furnace, and if the furnace operation is carried out in such a way that the feed is not subjected to the temperature at which induration and densification will occur for a time long enough to result in a significant loss of active surface per unit of weight prior to its reaching the reduction zone, many improved benefits in the overall reaction will be obtained.

It has been found that the operational function of the furnace including the material losses as well as the consumption of power per pound of alloy are dependent on the amount of water of hydration in the oxidic furnace feed, with the surprising fact that a higher content of water of hydration is extremely beneficial, while the use of fully calcined oxides is utterly detrimental. If the feed is composed of parts of calcined and parts of hydrated oxides, the higher the content of water of hydration in the mix, the better the performance.

The fact that a hydrated feed as opposed to a calcined feed results in a smoother furnace operation and a reduction in the power consumption necessary to produce a pound of alloy is, indeed, surprising and totally unexpected, especially in view of the fact that the large amount of water of hydration present has to be vaporized within the furnace and this certainly requires energy.

While not wishing to be bound by any theory of operation, nevertheless, a theoretical analysis of the improved results stemming from using a hydrated feed leads to the probable explanation that the presence of elemental silicon leads to a vapor phase reaction in which the silicon vapor acts as an intermediate reductant. The use of a feed material in a hydrated condition provides a greater internal surface area after dehydration, thereby allowing the elemental silicon vapor to more easily react with the feed. It is noted that the elemental silicon which must be present in the furnace feed has a significant vapor pressure which is approximately 10 mm of mercury at 1,700° C, 25 mm of mercury at 1,800° C, and 70 mm of mercury at 2,000° C. As the furnace feed is heated to that temperature at which the reduction of alumina and silica begins, i.e., above 1,700° C, it appears that in spite of the fact that the major reduction of said oxides takes place by the action of the carbon which is present, nevertheless, some intermediate reduction reactions are taking place which involve elemental silicon.

The effect of the silicon on the thermal reduction can be further explained by consideration of the following reactions which one can visualize as taking place in the vapor state.

$$Al_2O_3 + 2Si \text{ (vapor)} \rightarrow Al_2O \text{ (vapor)} + 2SiO \text{ (vapor)}$$
$$SiO_2 + Si \text{ (vapor)} \rightarrow 2SiO \text{ (vapor)}$$

The above vaporous suboxides resulting from the reaction with metallic silicon can then penetrate to the solid carbon and become further reduced.

It would appear that the optimum conditions for the reactions just described reside in the use of materials having a high surface area per unit weight. It seems that although the hydrated oxides lose their water of hydration during their descent in the furnace shaft before they reach the reaction zone, they do not become fully calcined so as to cause them to densify and lose surface area. By way of an illustration, it is known in the art that when hydrated alumina is subjected to the action of heat it loses all its water of hydration and then undergoes a transition to alpha alumina. Alpha alumina is an extremely dense material having a low surface area per unit weight and it is typical of the furnace charges heretofore employed by the workers in the prior art.

The term "fully calcined" as used in this specification means that both the dehydration phase and the subsequent densification phase have been essentially terminated. It should be understood that densification does not depend alone on the necessary high temperature but requires also considerable time for the molecular rearrangement which results in induration or densification.

It is to be immediately understood that the expressions "hydrated alumina" and "hydrated oxides," as used in this specification and claims, refers to ores containing water of hydration and specifically excludes the presence of water where it is not chemically combined, i.e., sorbed water. In the examples which follow, as well as in the claims, the water of hydration is determined only after drying the particular material at 110° C for 2 hours so that any sorbed but chemically uncombined water is removed. The ore is then heated to 1,000° C and the water content is determined.

The following table illustrates the water content and surface area of various oxides.

TABLE 1

| Material | H₂O Content % | Surface Area cm²/g × 10⁶ |
| --- | --- | --- |
| High Alpha (corundum) ceramic grade alumina | near zero | 0.0025 to 0.005 |
| Fully calcined kaolinite | near zero | 0.15 to 0.25 |
| Fully calcined metallurgical grade alumina | near zero | 0.2 to 1.0 |
| Activated bauxite | 6 to 10 | 1.7 to 2.3 |
| Activated Bayer alumina | 6 to 10 | 2.2 to 2.7 |

From the above table, it can be seen that the feed materials of this invention have extremely high surface areas when compared with the fully calcined material of the prior art.

Irrespective of any theoretical considerations which have been discussed above, the simple fact remains that an improved process for the thermal smelting of alumina-bearing ores will result if feed materials are used which have a water of hydration of from about 6 to 40 weight percent of the combined weight of alumina and silica present in the feed.

The second criticality of the novel process of this invention resides in the fact that the feed material must contain free elemental silicon and that said elemental silicon must be present in amounts ranging from 6 to 23 weight percent based on the total weight of alumina and silica in the feed. The free elemental silicon may be introduced into the furnace feed by using so-called silicon metal having a purity of about 95 percent as well as by using silicon-bearing alloys, such as ferrosilicon containing 85 percent silicon. Intermetallic complexes like those described in U.S. Pat. No. 3,257,199 are less suited than elementary silicon because the vapor pressure of the silicon derived from such complexes is much lower, not only in accordance with Raoult's Law, but also because of the necessary heat of formation with regard to such complexes as $FeAl_3Si_2$, $TiSi_2$ or $SiC$. A minor amount of intermetallic complexes containing elemental silicon may be admixed to the charge together with the elemental silicon and this technique results in added benefits. The intermetallic complexes add bulk and weight to the reduced aluminum-silicon alloy, thereby forming easier and more compact droplets of said alloy which unite faster with the pool of the metal on the furnace hearth and help to minimize carbide-forming back reactions by increasing the volume versus the reactive surface of the metal droplets coming from the furnace charge.

For economical considerations, it is preferred to use as an additive to the furnace feed a mixture of elementary silicon, intermetallics, including silicon carbide as it results as residue from refining steps similar to those disclosed in U.S. Pat. Nos. 3,254,988 and 3,257,199. In any event, whether elemental silicon be used alone or in admixture with silicon-containing intermetallics, nevertheless, it is an essential feature of the novel process of this invention that the feed material must contain elemental silicon in amounts ranging from 6 to 23 weight percent based on the total amount of alumina and silica in the feed. In those situations wherein mixtures of free elemental silicon and intermetallic complexes are employed, then, it is desired that the elemental silicon comprise at least 50 percent and more desirably 65 to 85 percent of the total amount of silicon present in such mixture.

The third criticality of the novel process of this invention resides in the use of a feed material which contains from 2.5 to 6 parts of alumina per part of silica by weight.

The selection within the range is, of course, dependent on the aluminum to silicon ratio desired in the smelted alloy. A particularly preferred ratio is from 2.8 to 4.8 parts of alumina per part of silica.

An essential consideration in the choice of the alumina to silica ratio present in the furnace feed resides in the temperature of fusion of these mixtures. As has been previously stated, it is desired in the novel process of this invention to have an extremely high surface area per pound of charge and if the ratio of silica and alumina in the furnace feed were such that the resulting oxide would have a low temperature of fusion, undesirable results would follow. Thus, if feed materials were employed which had less than 2.5 parts of alumina per part of silica the resulting feed material would have a low temperature of fusion and would be unsuitable for obtaining a smooth furnace run. On the other hand, if a feed material was employed which had a ratio of alumina to silica substantially beyond 6 to 1, economically unattractive consequences would occur due to the fact that the furnace would have to operate at higher temperatures and the vaporization losses and other consumption figures would necessarily become higher.

It is to be understood, of course, that adjustments in the ratio of alumina to silica may be necessary during the course of the furnace run in order to compensate for the inevitable vaporization losses of aluminum and silicon. In most cases, the vaporization loss is higher for silicon than for aluminum and, in accordance with conventional practices, must be compensated by adding more silica to the charge, preferably by local additions of lumps of quartz and charcoal. If, on the other hand, higher aluminum losses are experienced due to vaporization then, of course, more alumina must to be added.

The fourth criticality of the novel process of this invention involves the operation of the thermal reduction process in such a manner that the hydrated feed is passed through the furnace rapidly and at such a rate that it does not become fully calcined and densified prior to reaching the reaction zone of the furnace. Thus, the novel process of this invention depends on regulating the average rate of descent of the feed from the charge level at the top of the electric arc furnace down to the reaction zone. As has been previously pointed out, on its downward travel, the feed becomes dehydrated. The rate of descent should be sufficiently fast to minimize the time available for sintering and densification or fusion of the feed prior to the reduction of the oxides to their metallic state and to maintain the dispersed structure and the high surface area to weight ratio resulting from the dehydration of the hydrated oxides. As a practical rule, it was found that best results were obtained when the descent of the charge was regulated by apportioning approximately equal time for the charge to reach the reaction zone above 1,800° C and then to dwell within the reaction zone until the reaction is completed, i.e., until the charge is virtually entirely consumed by being reduced to the metallic state.

The best means of accomplishing the above-mentioned fast descent within the upper part of the furnace shaft is to have a restriction of the furnace cross sectional area available for the passing of the charge, i.e., the space between one or more electrodes and the furnace inner lining. The necessary dimensions can be estimated by using the apparent bulk density of the briquettes and the amount of material in weight necessary to match the electrical power of the furnace. A restricted space is necessary in order to accomplish the desired fast descent of the charge. In a preferred operation, the dimensions provide a downward passageway restricted to control the descent within the furnace in such a way that the charge travels approximately two-thirds of the shaft depth from the top in approximately one-half of the total time needed from the beginning of charging the materials to their complete reduction to the metallic state.

It is to be understood that the rate of descent in this invention is primarily regulated by the bulk density of the briquettes and by the furnace dimensions which provide a restricted space for the volume of briquettes which must pass through per hour.

Notwithstanding the above, and for reasons which are not completely understood, it has been found that the feed materials will not densify and conversely that a smooth furnace operation will result if the furnace is operated such that the total time which elapses from the moment at which the feed material is charged until it is reduced to its metallic state and tapped does not substantially exceed about 3 hours. As has been stated for reasons which are not completely understood, it would appear that if the 3-hour time limit is adhered to, the material will have to pass through the furnace at a rate sufficiently fast such that the aforementioned densification does not occur. This 3-hour time limit has been found to be acceptable irrespective of the size of the furnace or whether AC or DC current is being employed. It is to be understood that the three hours represents an average time based on the results of a 24-hour operation.

Although the novel process of this invention is operative with raw materials charged in any convenient manner such as in a lump form, a particularly preferred embodiment resides in having at least 50 percent of the charge, and even more desirably, at least 75 percent of the charge, in briquetted form. In preparing for briquetting, the feed materials are comminuted to a particle size substantially passing a Number 10 mesh sieve (U.S. Standard Mesh). By substantially passing, it is intended that approximately 90 percent or more of the particles pass through the No. 10 mesh screen. This particle size is specifically advisable for the elementary silicon which should be mixed and distributed throughout the briquette as evenly as practically possible. After the materials have been ground, they are thoroughly mixed and water is thereafter added in order to aid in briquetting. The briquetting is carried out in a conventional manner utilizing binders well known in the art. The most preferred binder is clay or kaolin which becomes sufficiently plastic when mixed with water. In most cases, the plasticity depends on the presence of montmorillonite in such clays.

The carbonaceous reductant which is employed in the novel process of the invention and is preferably in the briquetted mix may be selected from many sources known to the art, such as petroleum, coke, metallurgical coke, anthracite, bituminous coal, lignite coal, charcoal or peat, including peat coke.

The amount of carbon which is employed in the novel process of this invention is at least 80 percent of stoichiometric and preferably at least 90 percent of the stoichiometric amount necessary to reduce all of the oxides to their metallic states. The balance of the carbon is supplied by the electrode and/or by local additions in the form of wood chips.

The following examples will now illustrate the best mode contemplated for carrying out this invention.

EXAMPLE 1

This example will illustrate the preparation of an alloy containing 50 weight percent aluminum, 45 weight percent silicon, with the remainder iron, titanium and carbon.

A feed material comprising 94.5 parts of alumina, 37.7 parts of silica and 28.5 parts of commercial silicon (consisting of 96.0 percent weight silicon, 1.5 weight percent iron, 0.5 weight percent carbon, remainder other impurities) was formed into briquettes and then charged into a conventional thermal reduction furnace. The commercial silicon contained 93.3 percent elementary silicon, 1.5 percent Si being combined with Fe to form the intermetallic complex $FeSi_2$ and 1.2 percent Si being tied up as SiC. The briquetted feed contained 16 weight percent water of hydration which was determined by first drying at 110° C for 2 hours in order to remove any sorbed but chemically uncombined water and then heating to 1,000° C and measuring the combined water.

Thus, the above-identified feed material contained 34 weight percent water of hydration based on the total amount of alumina and silica charged. The ratio of alumina to silica was 2.5 to 1. The feed also was found to contain 20.1 percent of elemental silicon based on the total amount of alumina and silica present in the feed.

The briquetted feed material was then charged into a reduction furnace and operated in such a manner that the briquetted feed material did not densify prior to reaching the reduction zone of the furnace, i.e., the total time elapsed from the moment the charge entered the top of the furnace shaft and its being ready for tapping in the metallic state did not exceed 3 hours.

After all the oxides had been reduced to their corresponding metal, the furnace was tapped and found to yield the desired alloy.

EXAMPLE 2

The procedure of Example 1 was repeated with the exception that the desired alloy was one containing 70 weight percent aluminum, 25 weight percent silicon, with the remainder iron, titanium and carbon. The feed material comprised 132 parts of alumina, 26.4 parts of silica and 13 parts of the same silicon complex of Example 1. The briquetted feed material was found to contain 30 percent of water based on the total amount of alumina and silica present in the feed. The ratio of oxides was 5 parts of $Al_2O_3$ to one part of $SiO_2$ and the total amount of elemental silicon employed was 8 parts by weight based on the total amount of alumina and silica present in the feed.

The furnace was operated in the manner identical to that set forth in Example 1 such that the briquetted feed material did not densify, and after the oxide had been reduced to the metallic state the furnace was tapped and found to yield the desired aluminum silicon alloy.

EXAMPLE 3

A briquetted feed material was prepared which had the following composition:

|  | Lbs. | Content in lbs. of— | | |
|---|---|---|---|---|
|  |  | $Al_2O_3$ | $SiO_2$ | Combined $H_2O$ |
| Guyana Bauxite, as mined | 146.71 | 86.56 | 8.80 | 44.0 |
| K₁ kaolin, as mined | 35.01 | 14.00 | 14.81 | 5.0 |
| Rogers clay | 16.23 | 6.33 | 7.32 | 2.2 |
| Bituminous coal | 55.30 } | 2.10 | 2.10 |  |
| Charcoal | 18.43 } |  |  |  |
| Silicon Source #1: |  |  |  |  |
| Aluminum | 2.97 |  |  |  |
| Silicon | 3.44 |  |  |  |
| Iron | 0.39 | 2.00 | 2.00 |  |
| Titanium | 0.24 |  |  |  |
| Carbon (as SiC) | 0.96 |  |  |  |
| $Al_2O_3$ + $SiO_2$ (est.) | 4.00 |  |  |  |
| Silicon Source #2 (Recycle): |  |  |  |  |
| Aluminum | 5.87 |  |  |  |
| Silicon | 15.11 |  |  |  |
| Iron | 0.57 |  |  |  |
| Titanium | 0.26 |  |  |  |
| Carbon | 0.03 |  |  |  |
| Totals | 305.52 | 110.99 | 35.03 | 51.2 |

To the above briquetted mix were added 5 pounds of quartz and 10 pounds of wood chips as local additions. The total charge is therefore 320.52 pounds of which approximately 95 percent of the total charge is in the form of briquettes. Iron, titanium and carbon in silicon Source No. 1 and silicon Source No. 2 (recycle) combine with 3.85 pounds silicon-forming intermetallics and silicon carbide according to the stoichiometry of the above-mentioned compounds. Additionally, 1.39 pounds of aluminum are present as $FeAl_3Si_2$. The rest of the free aluminum amounting to 7.45 pounds is alloyed with approximately one pound of silicon in the form of an aluminum silicon alloy. The amount of silicon, i.e., 1 pound, which is in the aluminum silicon alloy is not contributing to the "free elemental cilicon" postulated by this invention due to the fact that it has a lower vapor pressure than free elemental silicon.

Hence, the free elemental silicon is the total amount present in silicon Source No. 1 and silicon Source No. 2, i.e., 18.55 pounds minus the 3.85 pounds present as intermetallics and minus the 1.0 pound present in the aluminum silicon alloy to leave a total of 13.70 pounds of free elemental silicon.

Thus, since the combined weight of alumina and silica is 151.02 pounds, the free elemental silicon present is approximately 9 percent.

The combined water of hydration is 35 percent of the total amount of silica plus alumina.

The ratio of alumina to silica is approximately 3.16 to 1.

The above-identified feed was then charged into a reduction furnace at a rate such that the material did not densify before entering the reduction zone of the furnace. After the oxides had been completely reduced to the metal, the furnace was tapped to yield an alloy having approximately the following composition:

| Aluminum | 60.80 |
|---|---|
| Silicon | 32.80 |
| Iron | 2.30 |
| Titanium | 2.70 |
| Carbon | 1.0 |
| Others | 0.4 |

The average time required for carrying out the above reduction was less than about 3 hours. The raw alloy produced can thereafter be treated in a manner familiar to those skilled in the art including the treatment disclosed in U.S. Pat. No. 3,374,289.

EXAMPLE 4

This example will show the use of a briquetted mix incorporating a large amount of calcined Bayer alumina. This is a borderline case in which the advantage of the dispersed structure of high surface to weight is limited to the effect of dehydration of the clay component only. This example results in acceptable furnace performance though it is markedly inferior to that of Example 3, i.e., it does not possess a water of hydration content as high as that of Example 3.

A briquetted feed material was prepared having the following composition:

|  | Lbs. | Content in lbs. of— | | |
|---|---|---|---|---|
|  |  | $Al_2O_3$ | $SiO_2$ | Combined $H_2O$ |
| Calcined Bayer alumina (metallurgical grade) | 81.83 | 80.75 |  |  |
| K₁ kaolin | 61.75 | 24.70 | 26.15 | 8.82 |
| Rogers clay | 14.23 | 5.55 | 6.43 | 1.93 |
| Bituminous coal | 56.84 } | 2.15 | 2.15 |  |
| Charcoal | 18.95 } |  |  |  |
| Rake-off (oxides only) | 4.00 | 2.00 | 2.00 |  |
| Totals | 237.60 | 115.15 | 36.73 | 10.75 |

Silicon Sources 1 and 2 were employed in the identical manner and in the identical amounts as that set forth in Example 3. The above briquetted mixture resulted in having an alumina-to-silica ratio of 3.27 to 1, the water of hydration is 7.10 parts based on the total amount of alumina and silica and the ratio of silicon is the same as that set forth in Example 3.

It is noted, however, that the furnace operation is not as smooth as that in Example 3 and the rate of power consumption per pound of alloy is higher. It is noted, however, that even with this small amount of water of hydration, improved results are obtained over using a completely calcined mix.

It is to be understood, however, that many modifications of the above examples are within the scope of this invention. Thus, for example, mixtures similar to that of Example 4, with the exception that the calcined alumina is replaced by Bayer alumina trihydrate, can be employed. In this latter case, the Bayer alumina trihydrate would provide approximately 44 pounds of water of hydration bringing the total water of hydration, to 54.7 pounds or approximately 36 percent of the total amount of alumina plus silica. In a situation of this type not only is the cost of calcination saved, but it has been found that the furnace performs much smoother and the consumption of materials and power are considerably lower.

EXAMPLE 5

The following example will illustrate the smelting of a feed such as that used in Example 3 in a 800 kw furnace. Specific data is also set forth with regard to power consumption and certain furnace dimensions.

Single phase, AC furnace
One electrode, diameter at top 30 inches, diameter at tip, approximately 28 inches.
Furnace shaft, inner diameter 46 inches.
Furnace shaft, depth 50 inches.
Charge bulk density, mean value over furnace depth: 51 lbs/cu. ft.
Charge rate: 440 to 460 lbs/hr. briquettes and 20 lbs/hr. quartz. Wood chips were charged from time to time, averaging 15 lbs/hr. The charge weight was predetermined to match the available power.
Power: average 800 kw.
Time until the charged briquettes reach the reaction zones of approximately 1,800° C and above: approximately 1½ hours.
Depth of shaft at which the charged briquettes reach the reaction zone of approximately 1,800° C and above: approximately 30–33 inches from top.
Dwelling time in the reaction zone until reaction is completed: approximately 1½ hours.
Tapping every 2 hours, averaging 250 lbs. of alloy.
30 lbs of wood chips were charged in one portion after 900 lbs. of briquettes had been charged into the furnace shaft.
Power consumption, 6 kwh/lb. of alloy.
Approximate recovery of Al, 90% and of Si, 85%.
Electrode consumption, 0.15 lbs./ per lb. alloy.
Duration of furnace run, 30 days.
Smooth operation. No burndown.

Composition of the resulting alloy: similar to the one shown with Example 3.

For the "as-lined" dimensions of the furnace shaft, i.e., before operations start, the ring-shaped cross-sectional area between the shaft and the electrode can be calculated to be 960 square inches. Assuming theoretically a uniform descent, the speed of descent in continuous operations would be determined by the hourly charge weight of 450 pounds divided by the product of area times bulk density. This results in a theoretical average rate of descent of 15.9 inch/hour. Consequently, in approximately three hours time, the charge would have travelled down the total "as-lined" depth of 50 inches. The latter actually changes during operations because of the accumulation of molten metal which may be about 2–3 inches deep at the bottom before tapping.

It has been found that with the dimensions of Example 5 and the hourly charged quantity of 450 lbs. briquettes having a charged bulk density about 57 lbs./cubic foot, the charge actually travels approximately 32 inches from the top in 1½ hours and passes through the rest of the depth of approximately 16 inches in an equal time of 1½ hours during which the reduction to the metallic state is completed.

It is apparent that the cross section of the space available for the descent of the charge is the most critical factor to be controlled if the power of the furnace, hence, the hourly charge weight and its bulk density have been fixed. If, in the above example, the cross section were double, the speed of descent would only be half the calculated value. This would not be satisfactory. On the other hand, there is a practical limitation on how narrow the shaft can be since too narrow a shaft would result in undue obstruction of the feed, thereby requiring too much stoking. Occasional stoking, e.g., immediately after tapping, may be required in any operation in which the cross section is restricted. However, it should not become a constantly necessary operation for obvious economical reasons.

It is understood that furnaces of different, e.g., more power, will need different dimensions. In any case, the overall throughput of charge materials must closely match the energy available in the arc. If more material goes down than the available power can chemically reduce, the furnace gets stuffed with unreduced matter. If too little material reaches the arc, surplus energy will be used up for vaporization of materials. These general considerations are known to the art and must be considered in the design of a furnace. In addition, this invention requires a restriction of the passageways between the one or more electrodes and the inner lining of the furnace shaft. By means of the restricted dimensions and by apportioning a predetermined amount of hourly charged materials matching the available power, the charge travels downward through approximately two-thirds of the shaft depth from the top in approximately one-half of the total time needed from charging the materials to their complete reduction.

If, e.g., the operation exemplified in Example 5 would be scaled up to a similar furnace which would, however, have 10,000 kw power, the better heat efficiency would allow to predict a consumption of only 4–4.5 kwh/lb. of alloy. Hence, the amount of charge materials would be approximately in the range of 6,750 to 7,600 lbs./hr. The depth of the furnace shell is selected according to generally known relationships in furnace design to be approximately 72 inches. The diameter of the electrode is 70 inches. In order to achieve a rate of descent as postulated in this invention, the free cross section available for the passage of the charge would have to be approximately ranging from 9,500 to 10,700 square inches. This corresponds to an inner diameter of the furnace shaft ranging from 130 to 136 inches.

Many modifications of the above invention will become apparent to those skilled in the art and it is not intended that it be limited except as necessitated by the appended claims.

What is claimed is:

1. In a process for the thermal reduction of alumina- and silica-bearing ores in the presence of elemental silicon and a carbonaceous reductant wherein the charge is heated in a reduction furnace until the ores are reduced to the metallic state, the improvement which comprises: A. introducing the alumina- and silica-bearing ores into said furnace in a substantially hydrated condition, such that the water of hydration in the hydrated oxides is from 6 to 40 weight percent of the total amount of alumina and silica charged; B. controlling the ratio of alumina to silica such that said ratio ranges from 2.5 to 6 parts of alumina per part of silica by weight in said charge; C. maintaining the elemental silicon in amounts ranging from 6 to 23 weight percent of the total amount of alumina and silica in said charge; and D. charging the materials into said reduction furnace and regulating the average rate of descent of the charge from the top of the furnace to the reaction zone to effect dehydration of said hydrated oxides and formation of a dispersed structure having a high surface area-to-weight ratio during the descent of the charge by apportioning approximately equal time for the charge to reach the reaction zone above 1,800° C. and then to dwell within the reaction zone until the reaction is completed; said rate being sufficiently fast to substantially maintain said dispersed structure and to minimize the time available for sintering the densification and fusion of said structure prior to the reduction of the oxides to their metallic state and tapping the resulting alloy.

2. The process of claim 1 wherein a substantial portion of the charge is in briquetted form and the elemental silicon is evenly distributed throughout the briquetted matter with silicon particles substantially passing No. 10 U. S. Standard mesh.

3. The process of claim 2 wherein the carbonaceous reductant is present in amounts of at least 80 percent of the theoretical amount necessary for complete reduction.

4. The process of claim 1 wherein the ratio of alumina to silica is between 2.8 and 4.8.

5. The process of claim 1 wherein the silicon is 10–20 percent of the total weight of silica and alumina.

6. The process of claim 1 wherein a portion of the silicon is replaced by intermetallic complexes of silicon chemically combined with iron, titanium, and aluminum.

7. The process of claim 1 wherein 65–85 percent of the silicon is provided as free elemental silicon.

8. In a process for the thermal reduction of alumina- and silica-bearing ores in the presence of elemental silicon and a carbonaceous reductant wherein the charge is heated in a reduction furnace having a furnace shaft and an electrode until the ores are reduced to the metallic state, the improvement which comprises introducing the alumina- and silica-bearing ores into said furnace in a substantially hydrated condition, such that the water of hydration is between 6–40 weight percent of the total amount of alumina and silica charged; controlling the ratio of alumina and silica such that it ranges from 2.5–6 parts of alumina per part of silica; maintaining the elemental silicon in amounts ranging from 6–23 weight percent of the total amount of alumina and silica in the feed; and applying a throughput of the charge fast enough: (a) for said charge to travel approximately two-thirds of the shaft depth from the top of the furnace in approximately 1½ hours, and (b) to effect its substantially complete reduction within approximately three hours time between its entering at said top and its being ready for tapping in the metallic state.

9. The process of claim 8, wherein said throughput is controlled by controlling the dimensional characteristics of the ring-shaped cross-sectional area between said shaft and said electrode, said area being calculated by dividing the hourly charge weight by the rate of descent of said charge and by the bulk density of said charge.

* * * * *